United States Patent
Zhuo et al.

(10) Patent No.: US 10,701,260 B2
(45) Date of Patent: Jun. 30, 2020

(54) FOCUSING METHOD, APPARATUS, COMPUTER READABLE STORAGE MEDIUM AND TERMINAL

(71) Applicant: GUANGDONG OPPO MOBILE TELECOMMUNICATIONS CORP., LTD., Dongguan (CN)

(72) Inventors: Shijie Zhuo, Dongguan (CN); Xiaopeng Li, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 122 days.

(21) Appl. No.: 15/871,416

(22) Filed: Jan. 15, 2018

(65) Prior Publication Data
US 2018/0352143 A1     Dec. 6, 2018

(30) Foreign Application Priority Data
May 31, 2017  (CN) .......................... 2017 1 0401503

(51) Int. Cl.
  *H04N 5/232*     (2006.01)
  *G02B 7/36*      (2006.01)
  *G02B 7/38*      (2006.01)

(52) U.S. Cl.
  CPC .......... *H04N 5/23212* (2013.01); *G02B 7/36* (2013.01); *G02B 7/38* (2013.01); *H04N 5/23258* (2013.01)

(58) Field of Classification Search
None
See application file for complete search history.

(56) References Cited

U.S. PATENT DOCUMENTS

| 7,512,328 | B2* | 3/2009 | Suda ...................... G03B 17/00 348/208.12 |
| 9,392,161 | B2* | 7/2016 | Kawai ................ H04N 5/23212 |
| 2007/0065127 | A1* | 3/2007 | Suda ...................... G03B 17/00 396/52 |
| 2010/0091175 | A1 | 4/2010 | Shintani et al. |

(Continued)

FOREIGN PATENT DOCUMENTS

| CN | 1574050 A | 2/2005 |
| CN | 102419505 A | 4/2012 |

(Continued)

OTHER PUBLICATIONS

PCTCN2018078053 English translation of International Search Report and Written Opinion dated Jun. 7, 2018, 11 pages.

(Continued)

*Primary Examiner* — Cynthia Segura
(74) *Attorney, Agent, or Firm* — Lathrop GPM LLP (57) ABSTRACT

The present disclosure relates to a focusing method, a focusing apparatus, a computer readable storage medium and a terminal. The focusing method includes: controlling an imaging apparatus to employ a contrast-detection autofocus mode to focus on a target object to be captured; obtaining a current focus value and a current offset value of the imaging apparatus correspondingly each time the imaging apparatus is driven to move; obtaining a plurality of focus values of validity from the obtained focus values according to the obtained offset values; and determining a maximum value from the plurality of focus values of validity.

15 Claims, 5 Drawing Sheets

(56) References Cited

U.S. PATENT DOCUMENTS

| | | | | |
|---|---|---|---|---|
| 2011/0050945 A1* | 3/2011 | Konno | ............... | H04N 5/232 348/222.1 |
| 2011/0133066 A1* | 6/2011 | Nozoe | ............... | H01J 37/265 250/252.1 |
| 2012/0262595 A1 | 10/2012 | Kishida et al. | | |
| 2015/0029387 A1* | 1/2015 | Kawai | ............... | H04N 5/23212 348/347 |
| 2015/0035855 A1* | 2/2015 | Kim | ............... | H04N 5/23212 345/619 |
| 2017/0318196 A1* | 11/2017 | Sasahara | ............... | H04N 1/6047 |
| 2019/0094487 A1* | 3/2019 | Uchida | ............... | H04N 5/23212 |

FOREIGN PATENT DOCUMENTS

| | | |
|---|---|---|
| CN | 103945126 A | 7/2014 |
| CN | 104618654 A | 5/2015 |
| CN | 105657278 A | 6/2016 |
| CN | 105827980 A | 8/2016 |
| CN | 106534702 A | 3/2017 |
| CN | 107124557 A | 9/2017 |
| JP | 2007086107 A | 4/2007 |
| JP | 2015022290 A | 2/2015 |

OTHER PUBLICATIONS

Chinese Patent Application No. 201710401503.3 English translation of Office Action dated Jan. 3, 2019, 9 pages.

Chinese Patent Application No. 201710401503.3 Office Action dated Jan. 3, 2019, 8 pages.

European Patent Application No. 18156274.5 extended Search and Opinion dated Sep. 10, 2018, 7 pages.

Taiwan Patent Application No. 106144852 Office Action dated Sep. 27, 2018, 12 pages.

Korean Patent Application No. 10-2019-7019129 Office Action dated Mar. 3, 2020, 5 pages.

Korean Patent Application No. 10-2019-7019129 English translation of Office Action dated Mar. 3, 2020, 5 pages.

Indian Patent Application No. 201834005045 Office Action dated Mar. 23, 2020, 6 pages.

* cited by examiner

FOCUSING METHOD, APPARATUS, COMPUTER READABLE STORAGE MEDIUM AND TERMINAL

FIELD

The present disclosure relates to a focusing technology field, and more particularly to a focusing method, a focusing apparatus, a computer readable storage medium and a terminal.

BACKGROUND

A terminal having a built-in imaging apparatus may employ a contrast-detection autofocus mode during photographing. In the contrast-detection autofocus mode, focusing is performed by calculating a focus value (FV). When the focus value reaches a peak value, a position of a lens in the imaging apparatus is a second position. However, the imaging apparatus may be out of focus when a jitter occurs on the terminal.

DISCLOSURE

Embodiments of the present disclosure provide a focusing method, a focusing apparatus, a computer readable storage medium and a terminal, which may prevent out-of-focus caused by a jitter and may realize precise focusing.

A focusing method includes the following. An imaging apparatus is controlled to employ a contrast-detection autofocus mode to focus on a target object to be captured. A current focus value and a current offset value of the imaging apparatus are correspondingly obtained each time the imaging apparatus is driven to move. A plurality of focus values of validity are obtained from the obtained focus values according to the obtained offset values. A maximum value is determined from the plurality of focus values of validity.

A computer readable storage medium has stored therein a computer program, when executed by a processor, causes the processor to perform following acts. An imaging apparatus is controlled to employ a contrast-detection autofocus mode to focus on a target object to be captured. A current focus value and a current offset value of the imaging apparatus are correspondingly obtained each time the imaging apparatus is driven to move. A plurality of focus values of validity are obtained from the obtained focus values according to the obtained offset values. A maximum value is determined from the plurality of focus values of validity.

A terminal includes an imaging apparatus, a gyroscope, a memory, a processor, and a computer program stored in the memory and executable by the processor. The processor performs following acts when executing the computer program. An imaging apparatus is controlled to employ a contrast-detection autofocus mode to focus on a target object to be captured. A current focus value and a current offset value of the imaging apparatus are correspondingly obtained each time the imaging apparatus is driven to move. A plurality of focus values of validity are obtained from the obtained focus values according to the obtained offset values. A maximum value is determined from the plurality of focus values of validity.

EMBODIMENTS OF THE PRESENT DISCLOSURE

In order to make the objectives, the technical solutions and the advantages of the present disclosure more clear, further explanations on this disclosure are given below in details with reference to figures and exemplary embodiments. It is to be understood that, the exemplary embodiments described herein are merely used to explain the disclosure, rather than to limit this disclosure.

Figure 1:
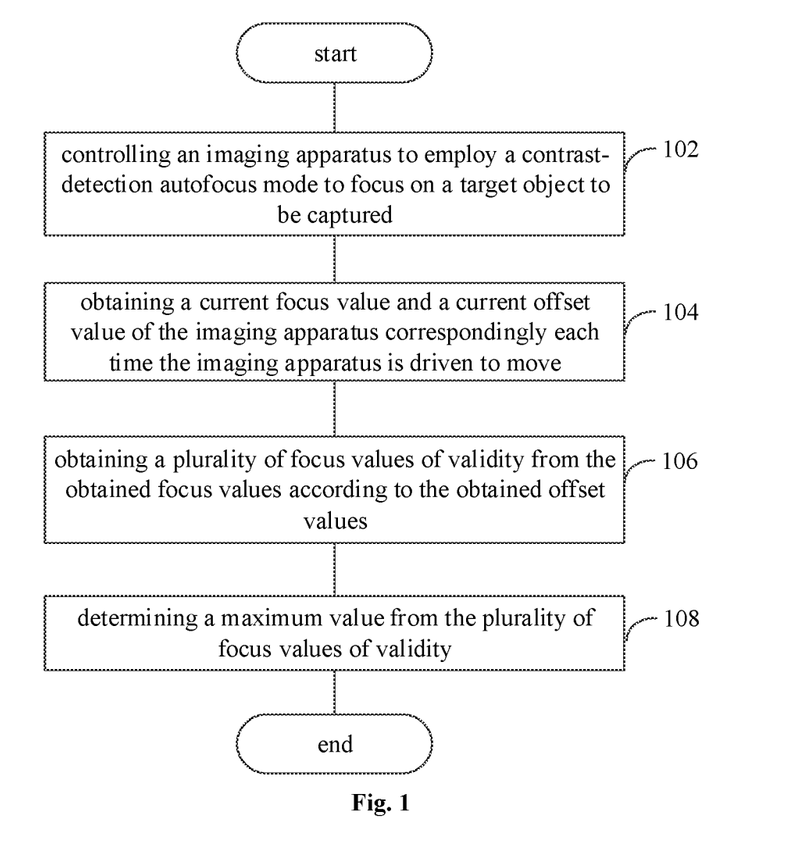
FIG. 1 is a flow chart of a focusing method according to an embodiment of the present disclosure.

FIG. 1 is a flow chart of a focusing method according to an embodiment of the present disclosure. As illustrated in FIG. 1, the focusing method includes the following.

At block 102, an imaging apparatus is controlled to employ a contrast-detection autofocus mode to focus on a target object to be captured.

In an embodiment, the imaging apparatus includes a lens and a driving device. The driving device is configured to drive the lens to move successively, along the optical axis direction, to a plurality of positions respectively from a first position to a second position within a focal distance range of the lens. The first position is a beginning position and the second position is an ending position.

In the contrast-detection autofocus technology, the lens begins to move gradually when the imaging apparatus begins focusing. A focus value (FV) of a focusing area is calculated in real time according to a preset algorithm during a moving process of the lens. It is found that the focus value increases gradually, and the focus value of the focusing area in an image is maximum (i.e., sharpness of the focusing area is highest) when the image is successfully focused. Generally, focus values are the data obtained from processing an image inputted by the imaging apparatus for representing image sharpness. Generally, the higher the contrast of the focusing area is, the higher the focus value of the image is. In the contrast-detection autofocus mode, the focusing is realized by finding a focusing position corresponding to a time when the focus value of the image is the highest.

A control module controls the imaging apparatus to employ the contrast-detection autofocus mode to begin to focus on the target object to be captured.

At block 104, a current focus value and a current offset value of the imaging apparatus are correspondingly obtained each time the imaging apparatus is driven to move.

When the control module drives the lens in the imaging apparatus to move, a focus value of an image currently outputted by the imaging apparatus and an offset value of the imaging apparatus corresponding to the focus value are correspondingly obtained if the lens moves each time. The offset value may be understood as a jitter value, i.e., a moving offset value or a rotation value of the imaging apparatus caused by external interference when the imaging apparatus employs the contrast-detection autofocus mode to focus on the target object to be captured.

At block 106, a plurality of focus values of validity are obtained from the obtained focus values according to the obtained offset values.

The plurality of focus values of validity are obtained according to the obtained offset values and a preset offset value. The focus value of validity refers to a focus value corresponding to an offset value in a preset offset range. When the contrast-detection autofocus mode is employed, a maximum value of the obtained focus values may have a local maximum value if a jitter occurs on the imaging apparatus. However, the imaging apparatus does not know the local maximum value is caused by the jitter, and may finally determine a position when the image is successfully focused at a position corresponding to the local maximum value, which may cause an out-of-focus phenomenon. The local maximum value formed by the jitter may be filtered out according to the obtained offset values and the preset offset value, with only the plurality of focus values of validity obtained, thus avoiding the out-of-focus phenomenon.

At block 108, a maximum value is determined from the plurality of focus values of validity.

The maximum value may be determined from the plurality of focus values of validity according to a preset algorithm. The focusing may be realized according to the maximum value.

With the above focusing method, the imaging apparatus is controlled to employ the contrast-detection autofocus mode to focus on the target object to be captured, the current focus value and the current offset value of the imaging apparatus are correspondingly obtained each time the imaging apparatus is driven to move, the local maximum value of the focus values formed by the jitter may be filtered out according to the obtained offset values and the preset offset value, and only the plurality of focus values of validity are obtained, avoiding the out-of-focus phenomenon, which may realize precise focusing on the target object to be captured.

Figure 2:
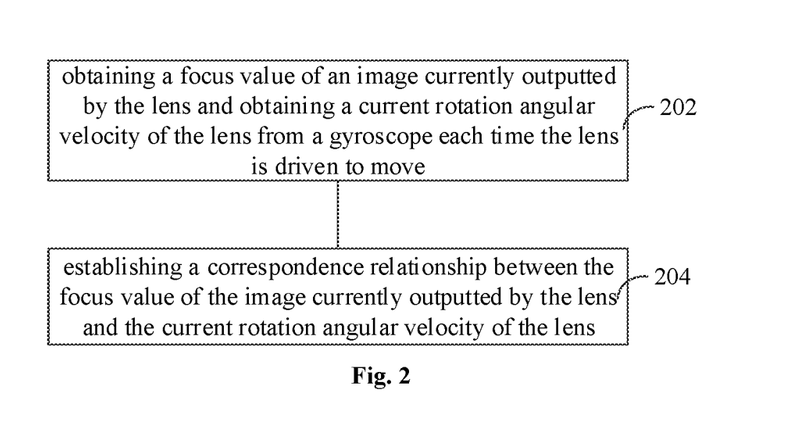
FIG. 2 is a flow chart of obtaining a current focus value and a current offset value of an imaging apparatus according to an embodiment of the present disclosure.

Referring to FIG. 2, in an embodiment, obtaining the current focus value and the current offset value of the imaging apparatus correspondingly each time the imaging apparatus is driven to move includes the following.

At block 202, a focus value of an image currently outputted by the lens is obtained and a current rotation angular velocity of the lens is obtained from a gyroscope each time the lens is driven to move.

The imaging apparatus includes the lens and the driving device. The driving device may drive the lens to move successively, along the optical axis direction, to a plurality of positions respectively from a first position to a second position within a focal distance range of the lens. Therefore, when the lens is driven by the driving device, a focus value of the image currently outputted by the lens is obtained each time the lens is driven to move, and at the same time, the gyroscope-built-in terminal is controlled to obtain the rotation angular velocity of the lens, and the rotation angular velocity is obtained from the gyroscope. That is, the offset value may be understood as the current rotation angular velocity of the lens obtained by the gyroscope. The gyroscope may be a tri-axial MEMS (micro-electro-mechanical system) gyroscope, or a six-axial sensor realized by combining a tri-axial MEMS gyroscope with a tri-axial MEMS accelerometer. The tri-axial MEMS gyroscope may detect positions, moving paths and accelerated speeds in six directions at a time.

At block 204, a correspondence relationship between the focus value of the image currently outputted by the lens and the current rotation angular velocity of the lens is established.

A one-to-one correspondence relationship is established according to the obtained focus values of the images outputted by the lens and the obtained rotation angular velocities of the lens. Further, a correspondence table may be established according to the established correspondence relationship.

Figure 3:
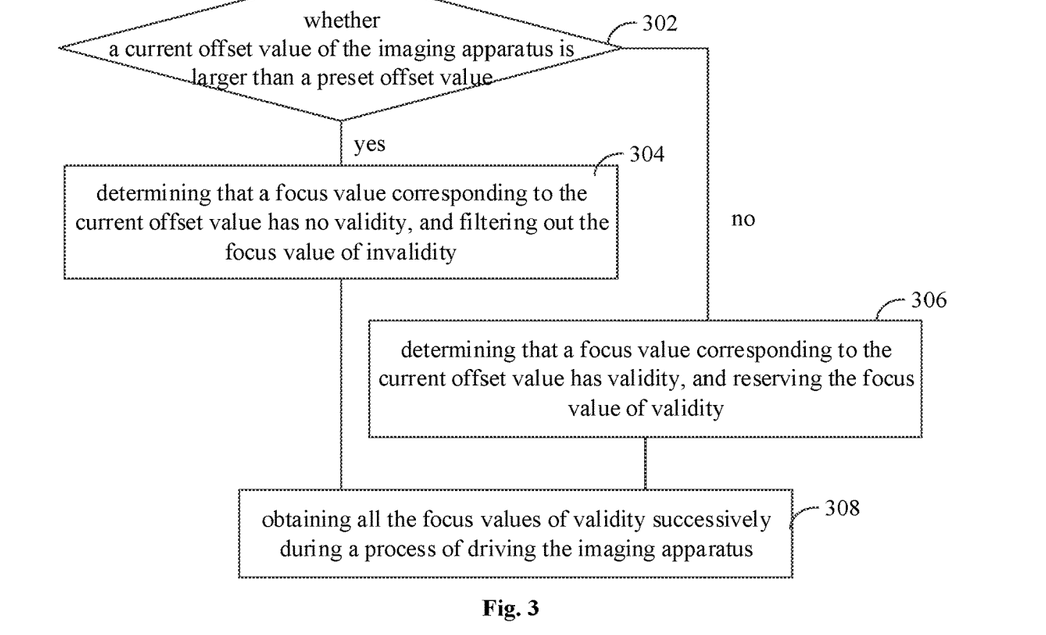
FIG. 3 is a flow chart of obtaining a plurality of focus values of validity from obtained focus values according to obtained offset values according to an embodiment of the present disclosure.

Referring to FIG. 3, in an embodiment, obtaining the plurality of focus values of validity from the obtained focus values according to the obtained offset values includes the following.

At block 302, it is determined whether a current offset value of the imaging apparatus is larger than a preset offset value.

In an embodiment, the offset values are rotation angular velocities. Each time an offset value of the imaging apparatus is obtained in real time, the obtained offset value may be compared with the preset offset value. It can be determined whether a jitter currently occurs on the imaging apparatus according to a comparison.

When the current offset value of the imaging apparatus is larger than the preset offset value, an act at block 304 is executed. That is, it is determined that the focus value corresponding to the current offset value larger than the preset offset value has no validity, and the focus value of invalidity is filtered out. That is, when the current offset value of the imaging apparatus is larger than the preset offset value, it may be determined that there is a jitter occurring on the imaging apparatus during a current focusing process. The focus value corresponding to the current offset value may be determined according to the established correspondence relationship. The determined focus value is determined to be a focus value of invalidity. A single and independent focus value of invalidity is filtered out. In other words, when there is a jitter occurring on the imaging apparatus during the focusing process, a corresponding focus value is an invalid value.

When the current offset value is less than the preset offset value, an act at block 306 is executed. That is, it is determined that a focus value corresponding to the current offset value not larger than the preset offset value has validity, and the focus value of validity is reserved. That is, when the current offset value of the imaging apparatus is less than the preset offset value, it may be determined that there is no jitter occurring on the imaging apparatus during a current focusing process. The focus value corresponding to the current offset value may be determined according to the established correspondence relationship. The determined focus value is determined to be a focus value of validity, and the focus value of validity is reserved.

At block 308, all the focus values of validity during a process of driving the imaging apparatus are successively obtained.

In a process of employing the contrast-detection autofocus mode to focus on the target object to be captured, i.e., in a process of the lens moving, along the optical axis direction, from the first position to the second position within the focal distance range of the lens, focus values of validity at a plurality of positions are successively obtained.

In an embodiment, determining the maximum value from the plurality of focus values of validity includes the following. A focusing waveform is obtained according to the plurality of focus values of validity. The maximum value is determined according to the focusing waveform. That is, the focusing waveform is drawn according to the plurality of obtained focus values of validity, and the maximum value of the focus values is determined according to the focusing waveform, thus a precise focusing may be realized according to the maximum value.

In an embodiment, the focusing method may further include an act of receiving an input from a user to set the preset offset value.

In detail, the user may set a preset value via a touch screen or speech input. For example, the user may set the preset value according his using habit, thus improving user experience.

Figure 4:
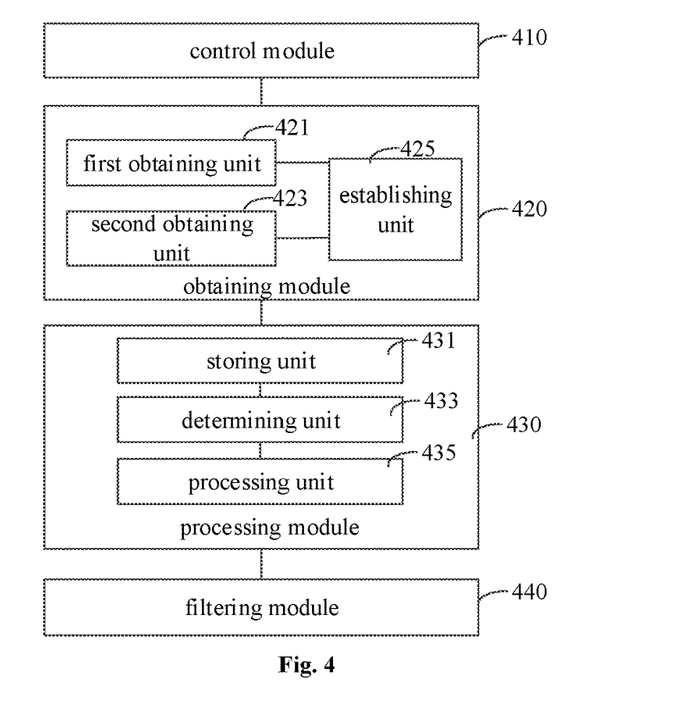
FIG. 4 is a block diagram illustrating a focusing apparatus according to an embodiment of the present disclosure.

Embodiments of the present disclosure further provide a focusing apparatus. FIG. 4 is a block diagram illustrating a focusing apparatus according to an embodiment of the present disclosure. As illustrated in FIG. 4, the focusing apparatus includes a control module 410, an obtaining module 420, a processing module 430, and a filtering module 440.

The control module 410 is configured to control an imaging apparatus to employ a contrast-detection autofocus mode to focus on a target object to be captured.

The obtaining module 420 is configured to obtain a current focus value and a current offset value of the imaging apparatus correspondingly each time the imaging apparatus is driven to move.

The processing module 430 is configured to obtain a plurality of focus values of validity from the obtained focus values according to the obtained offset values.

The filtering module 440 is configured to determine a maximum value from the plurality of focus values of validity.

With the above focusing device, the control module 410 may control the imaging apparatus to employ the contrast-detection autofocus mode to focus on the target object to be captured, the obtaining module 420 correspondingly obtains the current focus value and the current offset value of the imaging apparatus each time the imaging apparatus is driven to move, the processing module 430 may filter out the local maximum value of the focus values formed by a jitter according to the obtained offset values and a preset offset value, and only the plurality of focus values of validity are obtained, the filtering module 440 determines the maximum value from the plurality of focus values of validity, thus avoiding an out-of-focus phenomenon, which may realize precise focusing on the target object to be captured.

In an embodiment, the focusing apparatus includes a lens and a driving device. The driving device is configured to drive the lens to move successively, along the optical axis direction, to a plurality of positions respectively from a first position to a second position within a focal distance range of the lens. The first position is a beginning position and the second position is an ending position.

In the contrast-detection autofocus technology, the lens begins to move gradually when the imaging apparatus begins focusing. A focus value (FV) of a focusing area is calculated in real time according to a preset algorithm during a moving process of the lens. It is found that the focus value increases gradually, and the focus value of the focusing area in an image is maximum (i.e., sharpness of the focusing area is highest) when the image is successfully focused. Generally, focus values are the data obtained from processing an image inputted by the imaging apparatus for representing image sharpness. Generally, the higher the contrast of the focusing area is, the higher the focus value of the image is. In the contrast-detection autofocus mode, the focusing is realized by finding a focusing position corresponding to a time when the focus value of the image is the highest.

In an embodiment, the obtaining module 420 includes a first obtaining unit 421, a second obtaining unit 423, and an establishing unit 425.

The first obtaining unit 421 is configured to obtain a focus value of an image currently outputted by the lens. The imaging apparatus includes the lens and the driving device. The driving device may drive the lens to move successively, along the optical axis direction, to a plurality of positions respectively from a first position to a second position within a focal distance range of the lens. Therefore, when the lens is driven by the driving device, the first obtaining unit 421 obtains the focus value of the image currently outputted by the lens each time the lens is driven to move.

The second obtaining unit 423 is configured to obtain a current rotation angular velocity of the lens from a gyroscope. The gyroscope obtains the rotation angular velocity of the lens. The second obtaining unit 423 obtains the rotation angular velocity from the gyroscope. That is, the offset value may be understood as the current rotation angular velocity of the lens obtained by the gyroscope. The gyroscope may be a tri-axial MEMS (micro-electro-mechanical system) gyroscope, or a six-axial sensor realized by combining a tri-axial MEMS gyroscope with a tri-axial MEMS accelerometer. The tri-axial MEMS gyroscope may detect positions, moving paths and accelerated speeds in six directions at a time.

The establishing unit 425 is configured to establish a correspondence relationship between the focus value of the image currently outputted by the lens and the current rotation angular velocity of the lens.

The establishing unit 425 establishes a one-to-one correspondence relationship according to the obtained focus values of the images outputted by the lens and the obtained rotation angular velocities of the lens. The establishing unit 425 may further establish a correspondence table according to the established correspondence relationship.

In an embodiment, the processing module 430 includes a storing unit 431, a determining unit 433, and a processing unit 435.

The storing unit 431 is configured to store a preset offset value.

The determining unit 433 is configured to determine whether a current offset value of the imaging apparatus is larger than the preset offset value. Each time an offset value of the imaging apparatus is obtained in real time, the determining unit 433 compares the obtained offset value with the preset offset value.

The processing unit 435 is configured to successively obtain all the focus values of validity during a process of driving the imaging apparatus according to a result of the determining unit 433. When the current offset value of the imaging apparatus is larger than the preset offset value, the processing unit 435 may determine that there is a jitter occurring on the imaging apparatus during a current focusing process. The focus value corresponding to the current offset value may be determined according to the established correspondence relationship. The determined focus value is determined to be a focus value of invalidity. A single and independent focus value of invalidity is filtered out. When the current offset value is less than the preset offset value, the processing unit 435 may determine that there is no jitter occurring on the imaging apparatus during a current focusing process. The focus value corresponding to the current offset value may be determined according to the established correspondence relationship. The determined focus value is determined to be a focus value of validity, and the focus value of validity is reserved.

Figure 5:
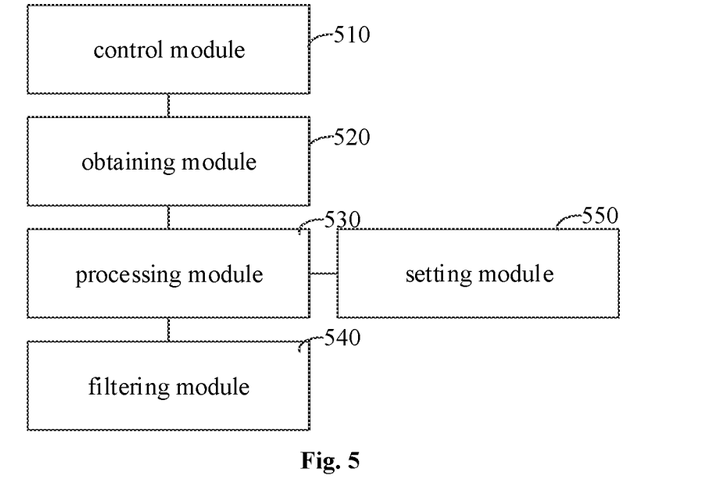
FIG. 5 is a block diagram illustrating a focusing apparatus according to another embodiment of the present disclosure.

FIG. 5 is a block diagram illustrating a focusing apparatus according to another embodiment of the present disclosure. As illustrated in FIG. 5, the focusing apparatus includes a control module 510, an obtaining module 520, a processing module 530, a filtering module 540, and a setting module 550. The control module 510, the obtaining module 520, the processing module 530, and the filtering module 540 have similar functions with corresponding modules in FIG. 4.

The setting module 550 is configured to receive an input from a user to set the preset offset value.

That is to say, the setting module 550 is configured to receive the input from a user to set a preset value. In detail, the user may set the preset value via a touch screen or speech input. For example, the user may set the preset value according his using habit, thus improving users' quality of experience.

The division of respective modules in the above focusing apparatus is only for illustration. In other embodiments, the focusing apparatus can be divided into different modules as required to accomplish all or part of the functions of the focusing apparatus.

Figure 6:
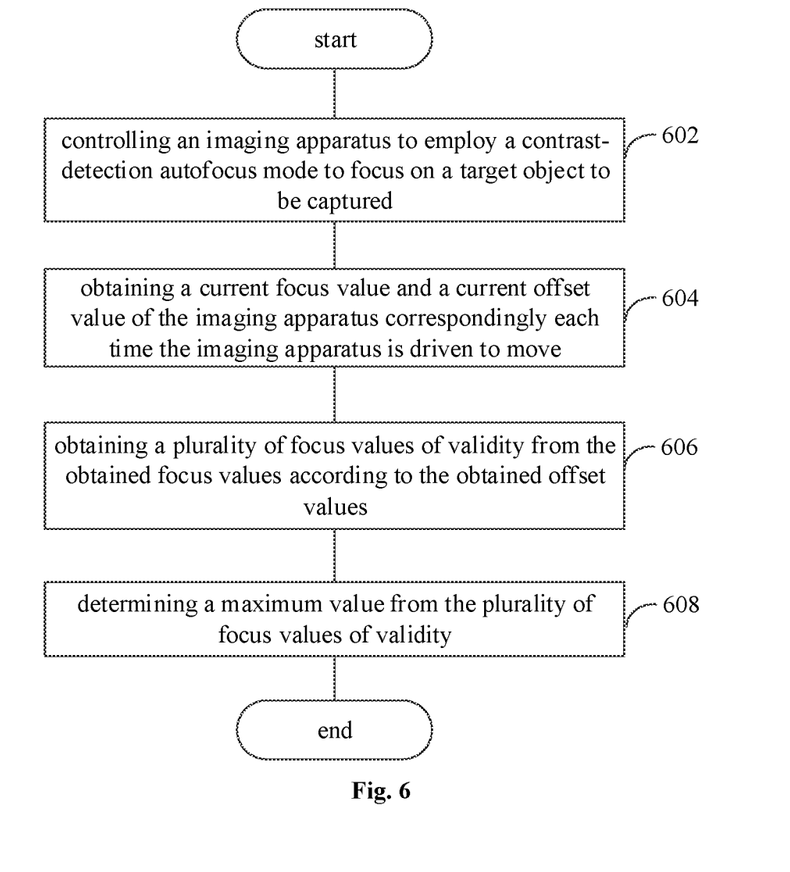
FIG. 6 is a flow chart of acts performed when a computer program stored in a computer readable storage medium is executed by a processor according to an embodiment of the present disclosure.

FIG. 6 is a flow chart of acts performed when a computer program (instruction) stored in a computer readable storage medium is executed by a processor according to an embodiment of the present disclosure. As illustrated in FIG. 6, the computer readable storage medium having stored therein a computer program (instruction), when executed by a processor, causes the processor to perform following acts.

At block 602, an imaging apparatus is controlled to employ a contrast-detection autofocus mode to focus on a target object to be captured.

In an embodiment, the imaging apparatus includes a lens and a driving device. The driving device is configured to drive the lens to move successively, along the optical axis direction, to a plurality of positions respectively from a first position to a second position within a focal distance range of the lens. The first position is a beginning position and the second position is an ending position.

In the contrast-detection autofocus technology, the lens begins to move gradually when the imaging apparatus begins focusing. A focus value (FV) of a focusing area is calculated in real time according to a preset algorithm during a moving process of the lens. It is found that the focus value increases gradually, and the focus value of the focusing area in an image is maximum (i.e., sharpness of the focusing area is highest) when the image is successfully focused. Generally, focus values are the data obtained from processing an image inputted by the imaging apparatus for representing image sharpness. Generally, the higher the contrast of the focusing area is, the higher the focus value of the image is. In the contrast-detection autofocus mode, the focusing is realized by finding a focusing position corresponding to a time when the focus value of the image is the highest.

A control module controls the imaging apparatus to employ the contrast-detection autofocus mode to begin to focus on the target object to be captured.

At block 604, a current focus value and a current offset value of the imaging apparatus are correspondingly obtained each time the imaging apparatus is driven to move.

When the control module drives the lens in the imaging apparatus to move, a focus value of an image currently outputted by the imaging apparatus and an offset value of the imaging apparatus corresponding to the focus value are correspondingly obtained if the lens moves each time. The offset value may be understood as a jitter value, i.e., a moving offset value or a rotation value of the imaging apparatus caused by external interference when the imaging apparatus employs the contrast-detection autofocus mode to focus on the target object to be captured.

At block 606, a plurality of focus values of validity are obtained from the obtained focus values according to the obtained offset values.

The plurality of focus values of validity are obtained according to the obtained offset values and a preset offset value. The focus value of validity refers to a focus value corresponding to an offset value in a preset offset range. When the contrast-detection autofocus mode is employed, a maximum value of the obtained focus values may have a local maximum value if a jitter occurs on the imaging apparatus. However, the imaging apparatus does not know the local maximum value is caused by the jitter, and may finally determine a position when the image is successfully focused at a position corresponding to the local maximum value, which may cause an out-of-focus phenomenon. The local maximum value formed by the jitter may be filtered out according to the obtained offset values and the preset offset value, with only the plurality of focus values of validity obtained, thus avoiding the out-of-focus phenomenon.

At block 608, a maximum value is determined from the plurality of focus values of validity.

The maximum value may be determined from the plurality of focus values of validity according to a preset algorithm. The focusing may be realized according to the maximum value.

When the computer program (instruction) in the above computer readable storage medium is executed, the imaging apparatus is controlled to employ the contrast-detection autofocus mode to focus on the target object to be captured, the current focus value and the current offset value of the imaging apparatus are correspondingly obtained each time the imaging apparatus is driven to move, the local maximum value of the focus values formed by the jitter may be filtered out according to the obtained offset values and the preset offset value, and only the plurality of focus values of validity are obtained, avoiding the out-of-focus phenomenon, which may realize precise focusing on the target object to be captured.

Figure 7:
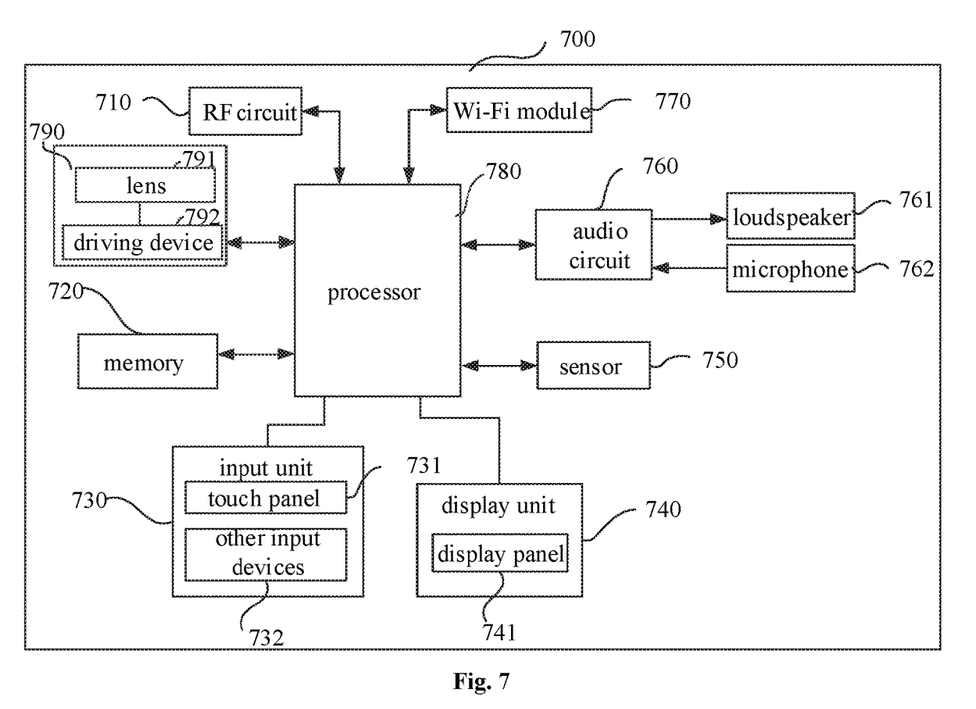
FIG. 7 is a schematic diagram of an internal structure of a terminal according to an embodiment of the present disclosure.

Embodiments of the present disclosure further provide a terminal. As illustrated in FIG. 7, for simplification of illustration, portions related to embodiments of the present disclosure are merely illustrated. For those technical details being not disclosed, embodiments of the present disclosure may be referred to. The terminal includes an imaging apparatus, a gyroscope, a memory, a processor, and a computer program stored in the memory and executable by the processor.

The terminal may include a mobile phone, a tablet computer, a wearable device or any other terminal device including an imaging apparatus. The imaging apparatus includes a front camera and/or a rear camera. The mobile phone as the terminal is taken as an example for illustrating.

FIG. 7 is a schematic diagram of an internal structure of a terminal according to an embodiment of the present disclosure. With reference to FIG. 7, the mobile phone includes a radio frequency (RF) circuit 710, a memory 720, an input unit 730, a display unit 740, a sensor 750, an audio circuit 760, a wireless fidelity (Wi-Fi) module 770, a processor 780 and an imaging apparatus 790, and the like. It may be understood by those skilled in the art that the structures of the mobile phone illustrated in FIG. 7 do not limit the structures of the mobile phone. The mobile phone may include less or more components than those illustrated in FIG. 7 or combinations thereof, or have a different arrangement of components.

The RF circuit 710 may be configured to receive or transmit a signal during a process of transmitting or receiving a message or making a call. The RF circuit 710 may be configured to receive downlink data from a base station and to transmit the downlink data to the processor 780. Alternatively, the RF circuit 710 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 710 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 720 may be configured to store software programs or modules. The processor 780 is configured to execute various functional applications and data processes of the mobile phone by running the software programs and modules stored in the memory 720. The memory 720 may mainly include a program storage region and a data storage region. The program storage region may store an operation system, at least one function required applications (such as an application having a sound playing function, an application having an image playing function) and the like. The data storage region may store data produced by using the mobile phone (such as audio data, an address book) and the like. In addition, the memory 720 may include a high speed random access memory and may include a non-volatility memory, such as at least one disk memory, a flash memory, or other volatility solid state memory.

The input unit 730 may be configured to receive figure or character information inputted and generate a key signal input related to a user setup or function control of the mobile phone 700. In detail, the input unit 730 may include a touch panel 731 and other input devices 732. The touch panel 731 (also called as touch screen) may be configured to gather touch operations near or on the touch panel 731 (such as an operation on the touch panel 731 or near the touch panel 731 of the user with a finger, a stylus or other suitable objects or attachments), and drive corresponding connected device according to a preset program. In an embodiment, the touch panel 731 may include a touch detection device and a touch controller. The touch detection device detects an orientation of the user's touch, detects a signal caused by the touch operation and sends the signal to the touch controller. The touch controller receives the touch information on the touch detection device, converts the touch information to touch point coordinates, and sends the touch point coordinates to the processor 780. Furthermore, the touch controller may receive and execute a command sent from the processor 780. The touch panel 731 may be implemented as resistance typed, capacitive typed, infrared typed and surface acoustic wave typed. In addition to the touch panel 731, the input unit 730 may further include other input devices 732. In detail, the other input devices 732 may include but without limitation to one or more of a physical keyboard, a functional key (such as a volume control key, a switch key and the like).

The display unit 740 may be configured to display information inputted by the user or information provided to the user or various menus of the mobile phone. The display unit 740 may include a display panel 741. In an embodiment, the display panel 741 may be configured as a liquid crystal display (LCD), an organic light-emitting diode (OLED) and the like. In an embodiment, the touch panel 731 may cover the display panel 741. When the touch panel 731 detects the touch operation on the touch panel 731 or near the touch panel 731, the touch operation is transmitted to the processor 780 to determine a type of the touch event. Thereafter, the processor 780 provides a corresponding visual output on the display panel 741 according to the type of the touch event. Although the touch panel 731 and the display panel 741 are two separate components to realize an input and output function of the mobile phone illustrated in FIG. 7, in certain embodiments, the touch panel 731 and the display panel 741 may be integrated to realize the input and output function of the mobile phone, The mobile phone 700 may further include at least one sensor 750, such as a gyroscope, an optical sensor, a motion sensor and other sensors. In detail, the gyroscope is configured to collect a rotation angular velocity of the mobile phone. The optical sensor may include a surrounding light sensor and a proximity sensor. The surrounding light sensor may adjust a brightness of the display panel 741 according to surrounding lights. The proximity sensor may close the display panel 741 and/or backlight when the mobile phone moves near ears of the user. The motion sensor may include an acceleration sensor, for measuring the acceleration value in various directions via the acceleration sensor, measuring a value and a direction of gravity when the phone is static, and identifying a state of the mobile phone (such as landscape screen and portrait screen switching), jitter related functions (such as a pedometer, a knocking) and the like. Furthermore, the mobile phone may be configured with a barometer, a hygrometer, a thermometer, an infrared sensor and other sensors.

The audio circuit 760, a loudspeaker 761 and a microphone 762 may provide an audio interface between the user and the phone. The audio circuit 760 may transmit an electrical signal converted from the audio data received to the loudspeaker 761. The loudspeaker 761 converts the electrical signal to a sound signal and output the sound signal. In another aspect, the microphone 762 may convert gathered sound singles to electrical signals. The audio circuit 760 receives and converts the electrical signals to audio data and outputs the audio data to the processor 780 to be processed. The audio data processed by the processor 780 may be transmitted to another mobile phone via the RF circuit 710 or may be stored in the memory 720 to be subsequently processed.

Wi-Fi is a short distance wireless communication technology. The mobile phone may help the user to receive or send an e-mail, search webpages, access to stream medium via the Wi-Fi module 770. The Wi-Fi module 770 provides a wireless broadband Internet access. Although the Wi-Fi module 770 is illustrated in FIG. 7, it may be understood that, the Wi-Fi module 770 is not necessary for the mobile phone 700, thus it may be omitted according to demands.

The processor 780 is a control center of the phone, which utilizes various interfaces and wires to connect various parts of the phone. By running or executing the software program and/or modules stored in the memory 720, and by invoking data stored in the memory 720, the various functions and data processing functions may be executed, thus integrally monitoring the mobile phone. In an embodiment, the processor 780 may include one or more processing units. In an embodiment, the processor 780 may be integrated with an application processor or a modem processor. The application processor mainly processes the operation system, a user interface and an application. The modem processor mainly processes wireless communication. It may be understood that, the above modem controller may be not integrated in the processor 780.

The mobile phone 700 may further include an imaging apparatus 790. The imaging apparatus includes a lens 791 and a driving device 792. The driving device 792 is configured to drive the lens 791 to move successively, along the optical axis direction, to a plurality of positions respectively from a first position to a second position within a focal distance range of the lens 791.

The mobile phone 700 may further include a power supply (such as a battery) for providing powers to various parts of the mobile phone. Alternatively, the power supply may be logically connected to a power management system and the processor 780, thereby managing a charging, discharging and power consumption via the power management system.

Figure 8:
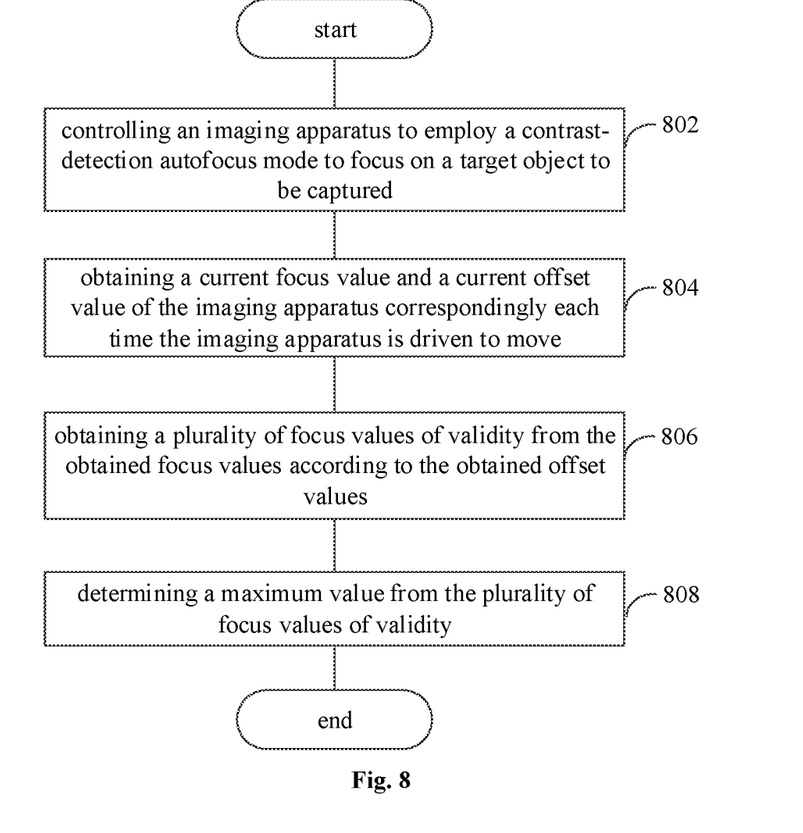
FIG. 8 is a flow chart of acts performed when a processor of a terminal executes a computer program according to an embodiment of the present disclosure.

In embodiments of the present disclosure, the processor 780 included in the terminal performs following acts when executing the computer program stored in the memory.

At block 802, an imaging apparatus is controlled to employ a contrast-detection autofocus mode to focus on a target object to be captured.

In an embodiment, the imaging apparatus includes a lens and a driving device. The driving device is configured to drive the lens to move successively, along the optical axis direction, to a plurality of positions respectively from a first position to a second position within a focal distance range of the lens. The first position is a beginning position and the second position is an ending position.

In the contrast-detection autofocus technology, the lens begins to move gradually when the imaging apparatus begins focusing. A focus value (FV) of a focusing area is calculated in real time according to a preset algorithm during a moving process of the lens. It is found that the focus value increases gradually, and the focus value of the focusing area in an image is maximum (i.e., sharpness of the focusing area is highest) when the image is successfully focused. Generally, focus values are the data obtained from processing an image inputted by the imaging apparatus for representing image sharpness. Generally, the higher the contrast of the focusing area is, the higher the focus value of the image is. In the contrast-detection autofocus mode, the focusing is realized by finding a focusing position corresponding to a time when the focus value of the image is the highest.

A control module controls the imaging apparatus to employ the contrast-detection autofocus mode to begin to focus on the target object to be captured.

At block 804, a current focus value and a current offset value of the imaging apparatus are correspondingly obtained each time the imaging apparatus is driven to move.

When the control module drives the lens in the imaging apparatus to move, a focus value of an image currently outputted by the imaging apparatus and an offset value of the imaging apparatus corresponding to the focus value are correspondingly obtained if the lens moves each time. The offset value may be understood as a jitter value, i.e., a moving offset value or a rotation value of the imaging apparatus caused by external interference when the imaging apparatus employs the contrast-detection autofocus mode to focus on the target object to be captured.

At block 806, a plurality of focus values of validity are obtained from the obtained focus values according to the obtained offset values.

The plurality of focus values of validity are obtained according to the obtained offset values and a preset offset value. The focus value of validity refers to a focus value corresponding to an offset value in a preset offset range. When the contrast-detection autofocus mode is employed, a maximum value of the obtained focus values may have a local maximum value if a jitter is occurs on the imaging apparatus. However, the imaging apparatus does not know the local maximum value is caused by the jitter, and may finally determine a position when the image is successfully focused at a position corresponding to the local maximum value, which may cause an out-of-focus phenomenon. The local maximum value formed by the jitter may be filtered out according to the obtained offset values and the preset offset value, with only the plurality of focus values of validity obtained, thus avoiding the out-of-focus phenomenon.

At block 808, a maximum value is determined from the plurality of focus values of validity.

The maximum value may be determined from the plurality of focus values of validity according to a preset algorithm. The focusing may be realized according to the maximum value.

When the processor in the terminal executes the program, the imaging apparatus is controlled to employ the contrast-detection auto-focus mode to focus on the target object to be captured, the current focus value and the current offset value of the imaging apparatus are correspondingly obtained each time the imaging apparatus is driven to move, the local maximum value of the focus values formed by the jitter may be filtered out according to the obtained offset values and the preset offset value, and only the plurality of focus values of validity are obtained, avoiding the out-of-focus phenomenon, which may realize precise focusing on the target object to be captured.

In order to make the description simple, all possible combinations of the technical features in the foregoing embodiments are not described. However, as long as there is no conflict between the technical features in the embodiments, any combination of technical features in the above-described embodiments may be adopted, which should be considered in the scope of this specification.

The above embodiments illustrate merely some implementations of the present disclosure, which are described in details but are not construed to limit the scope of the present disclosure. It should be pointed that, for those skilled in the art, without departing from the principle of the present disclosure, various changes and improvements may be made, which are covered by the protection scope of the present disclosure. Therefore, the protection scope of the present disclosure is according to the appended claims.

What is claimed is:
1. A focusing method, comprising:
controlling an imaging apparatus to employ a contrast-detection autofocus mode to focus on a target object to be captured;
obtaining a current focus value and a current offset value of the imaging apparatus correspondingly each time the imaging apparatus is driven to move;
in response to detecting that the current offset value is larger than a preset offset value, determining that a focus value corresponding to the current offset value has no validity, and filtering out the focus value of invalidity;

in response to detecting that the current offset value is not larger than the preset offset value, determining that a focus value corresponding to the current offset value has validity, and reserving the focus value of validity; and obtaining all the focus values of validity successively during a process of driving the imaging apparatus; and determining a maximum value from the plurality of focus values of validity.

2. The focusing method according to claim 1, wherein the imaging apparatus comprises a lens and a driving device, the driving device is configured to drive the lens to move successively along an optical axis direction to a plurality of positions respectively from a first position to a second position within a focal distance range of the lens;

obtaining a current focus value and a current offset value of the imaging apparatus correspondingly each time the imaging apparatus is driven to move comprises:

obtaining a focus value of an image currently outputted by the lens and obtaining a current rotation angular velocity of the lens as the current offset value each time the lens is driven to move; and establishing a correspondence relationship between the focus value of the image currently outputted by the lens and the current rotation angular velocity of the lens.

3. The focusing method according to claim 2, wherein obtaining a current rotation angular velocity of the lens as the current offset value comprises:

obtaining the current rotation angular velocity of the lens as the current offset value from a gyroscope.

4. The focusing method according to claim 1, wherein determining a maximum value from the plurality of focus values of validity comprises:

obtaining a focusing waveform according to the plurality of focus values of validity; and determining the maximum value according to the focusing waveform.

5. The focusing method according to claim 4, further comprising:

receiving an input from a user to set the preset offset value.

6. A non-transitory computer readable storage medium, having stored therein a computer program, when executed by a processor, causes the processor to perform following acts:

controlling an imaging apparatus to employ a contrast-detection autofocus mode to focus on a target object to be captured;

obtaining a current focus value and a current offset value of the imaging apparatus correspondingly each time the imaging apparatus is driven to move;

in response to detecting that the current offset value is larger than a preset offset value, determining that a focus value corresponding to the current offset value has no validity, and filtering out the focus value of invalidity;

in response to detecting that the current offset value is not larger than the preset offset value, determining that a focus value corresponding to the current offset value has validity, and reserving the focus value of validity; and obtaining all the focus values of validity successively during a process of driving the imaging apparatus; and determining a maximum value from the plurality of focus values of validity.

7. The non-transitory computer readable storage medium according to claim 6, wherein the imaging apparatus comprises a lens and a driving device, the driving device is configured to drive the lens to move successively along an optical axis direction to a plurality of positions respectively from a first position to a second position within a focal distance range of the lens;

obtaining a current focus value and a current offset value of the imaging apparatus correspondingly each time the imaging apparatus is driven to move comprises:

obtaining a focus value of an image currently outputted by the lens and obtaining a current rotation angular velocity of the lens as the current offset value each time the lens is driven to move; and establishing a correspondence relationship between the focus value of the image currently outputted by the lens and the current rotation angular velocity of the lens.

8. The non-transitory computer readable storage medium according to claim 7, wherein obtaining a current rotation angular velocity of the lens as the current offset value comprises:

obtaining the current rotation angular velocity of the lens as the current offset value from a gyroscope.

9. The non-transitory computer readable storage medium according to claim 6, wherein determining a maximum value from the plurality of focus values of validity comprises:

obtaining a focusing waveform according to the plurality of focus values of validity; and determining the maximum value according to the focusing waveform.

10. The non-transitory computer readable storage medium according to claim 9, wherein the processor is further configured to perform following acts:

receiving an input from a user to set the preset offset value.

11. A terminal, comprising an imaging apparatus, a gyroscope, a memory, a processor, and a computer program stored in the memory and executable by the processor, wherein the processor performs following acts when executing the computer program:

controlling an imaging apparatus to employ a contrast-detection autofocus mode to focus on a target object to be captured;

obtaining a current focus value and a current offset value of the imaging apparatus correspondingly each time the imaging apparatus is driven to move;

in response to detecting that the current offset value is larger than a preset offset value, determining that a focus value corresponding to the current offset value has no validity, and filtering out the focus value of invalidity;

in response to detecting that the current offset value is not larger than the preset offset value, determining that a focus value corresponding to the current offset value has validity, and reserving the focus value of validity; and obtaining all the focus values of validity successively during a process of driving the imaging apparatus; and determining a maximum value from the plurality of focus values of validity.

12. The terminal according to claim 11, wherein the imaging apparatus comprises a lens and a driving device, the driving device is configured to drive the lens to move successively along an optical axis direction to a plurality of positions respectively from a first position to a second position within a focal distance range of the lens;

obtaining a current focus value and a current offset value of the imaging apparatus correspondingly each time the imaging apparatus is driven to move comprises:

obtaining a focus value of an image currently outputted by the lens and obtaining a current rotation angular velocity of the lens as the current offset value each time the lens is driven to move; and establishing a correspondence relationship between the focus value of the image currently outputted by the lens and the current rotation angular velocity of the lens.

13. The terminal according to claim 12, wherein obtaining a current rotation angular velocity of the lens as the current offset value comprises:

obtaining the current rotation angular velocity of the lens as the current offset value from the gyroscope.

14. The terminal according to claim 11, wherein determining a maximum value from the plurality of focus values of validity comprises:

obtaining a focusing waveform according to the plurality of focus values of validity; and determining the maximum value according to the focusing waveform.

15. The terminal according to claim 14, wherein the computer program further comprises:

receiving an input from a user to set the preset offset value.

* * * * *